(12) United States Patent
Ueno et al.

(10) Patent No.: US 6,467,329 B1
(45) Date of Patent: Oct. 22, 2002

(54) NEUTRAL POINT VOLTAGE ADJUSTER OF TORQUE SENSOR

(75) Inventors: Takayuki Ueno; Shunya Senda, both of Tochigi (JP)

(73) Assignee: Showa Corporation (JP)

(*) Notice: Subject to any disclaimer, the term of this patent is extended or adjusted under 35 U.S.C. 154(b) by 0 days.

(21) Appl. No.: 09/503,637

(22) Filed: Feb. 14, 2000

(30) Foreign Application Priority Data

Feb. 15, 1999 (JP) .......................................... 11-035780

(51) Int. Cl.[7] .............................................. G01L 25/00
(52) U.S. Cl. ......................................... 73/1.11; 702/87
(58) Field of Search ................................ 73/1.11, 1.09, 73/1.88; 702/87, 104

(56) References Cited

U.S. PATENT DOCUMENTS

| | | | | |
|---|---|---|---|---|
| 3,877,300 A | * | 4/1975 | Ginns .......................... | 73/1.11 X |
| 4,254,469 A | * | 3/1981 | Whitely ....................... | 702/87 X |
| 4,395,678 A | * | 7/1983 | Pelta ........................... | 702/87 X |
| 4,656,875 A | * | 4/1987 | Uitermarkt ................... | 73/1.11 X |
| 4,733,633 A | * | 3/1988 | Kamada et al. ............. | 702/87 X |
| 4,739,665 A | * | 4/1988 | Norvdall ..................... | 73/862.36 |
| 4,850,442 A | * | 7/1989 | Naito et al. ................. | 73/1.13 |
| 5,121,118 A | * | 6/1992 | Hermann ..................... | 702/87 X |
| 5,365,768 A | * | 11/1994 | Suzuki et al. ............... | 702/104 X |
| 5,426,986 A | * | 6/1995 | Brassert et al. ............. | 73/1.11 X |
| 6,029,497 A | * | 2/2000 | Brinks et al. ............... | 73/1.88 X |
| 6,163,148 A | * | 12/2000 | Takada et al. .............. | 324/226 |
| 6,314,329 B1 | * | 11/2001 | Madau et al. ............... | 702/104 X |

FOREIGN PATENT DOCUMENTS

| | | | | |
|---|---|---|---|---|
| DE | 3429854 A1 | * | 3/1985 | .......... G01L/25/00 |
| JP | 9263259 | | 9/1997 | |

* cited by examiner

Primary Examiner—Thomas P. Noland
(74) Attorney, Agent, or Firm—Orum & Roth

(57) ABSTRACT

The present invention provides a neutral point voltage adjuster of a torque sensor which comprises: a pair of coils having inductances changing mutually in a reverse direction in accordance with a torque; and a differential amplifier means inputting first and second sub-voltages based on each inductance change of both coils, and amplifying a difference between the first and second sub-voltages so as to output it as a main voltage, and which uses a neutral point where no torque is inputted as a boundary between right and left directions, and detects each torsional torque in the right and left direction, comprising: a neutral point voltage setter for displacing a main voltage of an output from the differential amplifier on the basis of an adjusting signal so as to set a neutral point voltage; a memory for storing a neutral point voltage setting state by the neutral point voltage setter; and a neutral point voltage adjuster for storing a neutral point voltage used as a reference of a main voltage, and inputting the main voltage, and further, outputting the adjusting signal to the neutral point voltage setter so that a difference between the neutral paint voltage read from the main voltage and the reference neutral point voltage is reduced.

6 Claims, 4 Drawing Sheets

NEUTRAL POINT VOLTAGE ADJUSTER OF TORQUE SENSOR

BACKGROUND OF THE INVENTION

1. Field of the Invention

The present invention relates to a neutral point voltage adjuster in a torque sensor which uses a neutral point as a boundary of right and left directions, and detects each torsional torque in the right and left directions on the basis of an inductance change in a pair of coils.

2. Description of the Related Art

In a torque sensor, unless an output voltage (a neutral paint voltage) at a neutral point which no torque is inputted, is outputted as a predetermined voltage, control is not accurately carried out.

So, the following methods have been proposed; more specifically, there is a method of setting the output voltage of the torque sensor to a predetermined reference voltage by operating a manually variable resistor, and a method of previously measuring an error between the output voltage of the torque sensor and the predetermined reference voltage, and compensating and controlling the error when carrying out control.

However, according to the former method, that is, a neutral point voltage adjusting method by a variable resistor, fluctuation of resistance valve is common, reliability is low, and further, adjusting operation is troublesome.

According to the latter method, that is, a method of correcting an error when carrying out control, the output of the torque sensor contains an error; for this reason, a control side must recognize an error peculiar to the torque sensor, and therefore, this method is not in general use.

SUMMARY OF THE INVENTION

The present invention has been achieved in view of the above problem. It is, therefore, an object of the present invention to provide a neutral point voltage adjuster of a torque sensor which can simply and securely adjust a neutral point voltage, and is excellent in general use.

To achieve the above object, the present invention provides a neutral point voltage adjuster of a torque sensor which comprises: a pair of coils having inductances changing mutually in a reverse direction in accordance with a torque; and a differential amplifier means inputting first and second sub-voltages based on each inductance change of both coils, and amplifying a difference between the first and second sub-voltages so as to output it as a main voltage, and which uses a neutral point where no torque is inputted as a boundary between right and left directions, and detects each torsional torque in the right and left direction. A neutral point voltage setting means is employed for displacing a main voltage of an output from the differential amplifier means on the basis of an adjusting signal so as to set a neutral point voltage; a staring means for staring a neutral point voltage setting state by the neutral point voltage setting means; and a neutral point voltage adjusting means for storing a neutral point voltage used as a reference of a main voltage, and inputting the main voltage, and further, outputting the adjusting signal to the neutral point voltage setting means so that a difference between the neutral point voltage read from the main voltage and the reference neutral point voltage is made small.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

One embodiment of the present invention will be described below with reference to FIG. 1 to FIG. 4.

Figure 1:
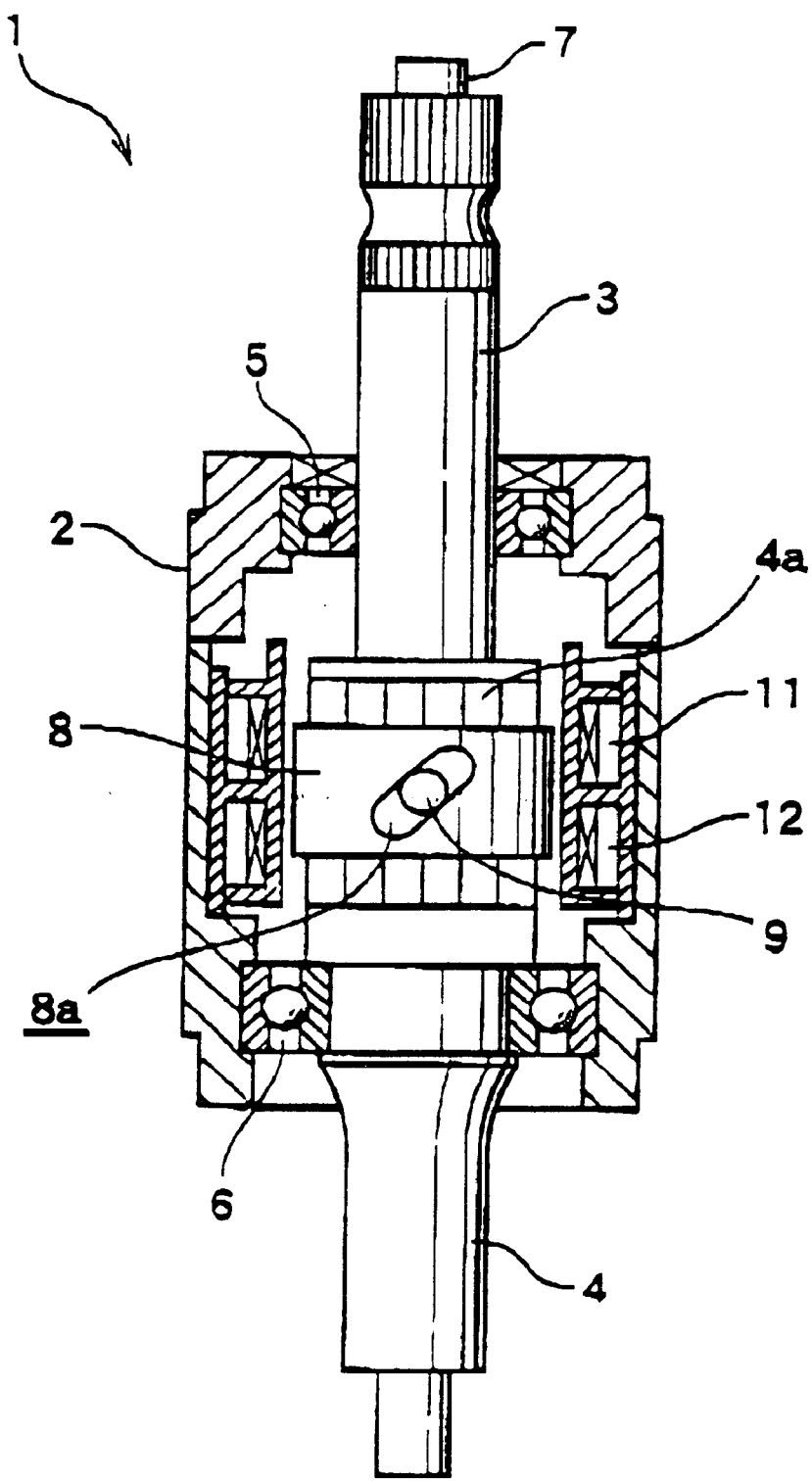
FIG. 1 is a view schematically showing a construction of mechanical parts of a torque sensor according to one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, and coaxially inserted into a housing 2, and are connected by a torsion bar 7 therein.

A cylindrical core 8 is fitted onto a serrated outer peripheral surface of a large-diameter end portion 4a of the output shaft 4, and is provided so as to be slidable in only an axial direction with respect to the output shaft 4. A slider pin 9 projected from the input shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 slidable along an axial direction via a space.

These two coils 11 and 12 are arranged at a side opposite to each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed; as a result, a relative displacement of a rotating direction is generated between the input shaft 3 and the output shaft 4.

The relative displacement of the rotating direction slides the core 8 to the axial direction by an engagement of the slider pin 9 and the spiral groove 8a.

When the core 8 is moved to the axial direction, each area of the coils 11 and 12 surrounding the core 8 varies, and there is a relation such that when an area of one coil surrounding the core 8 increases, an area of the other coil surrounding the core 8 decreases.

When the area surrounding the core 8 increase, a magnetic low increases; therefore, an inductance of the coil decreases. Conversely, when the area surrounding the core 8 decrease, a magnetic loss decreases; therefore, an inductance of the coil increases.

Accordingly, in the case where a torque of moving the core 8 to the coil 11 side acts, an inductance L1 of the coil 11 decreases, and an inductance L2 of the coil 12 increases. Conversely, in the case where a torque of moving the core 8 to the coil 12 side acts, an inductance L1 of the coil 11 increases, and an inductance 12 of the coil 12 decreases.

Figure 2:
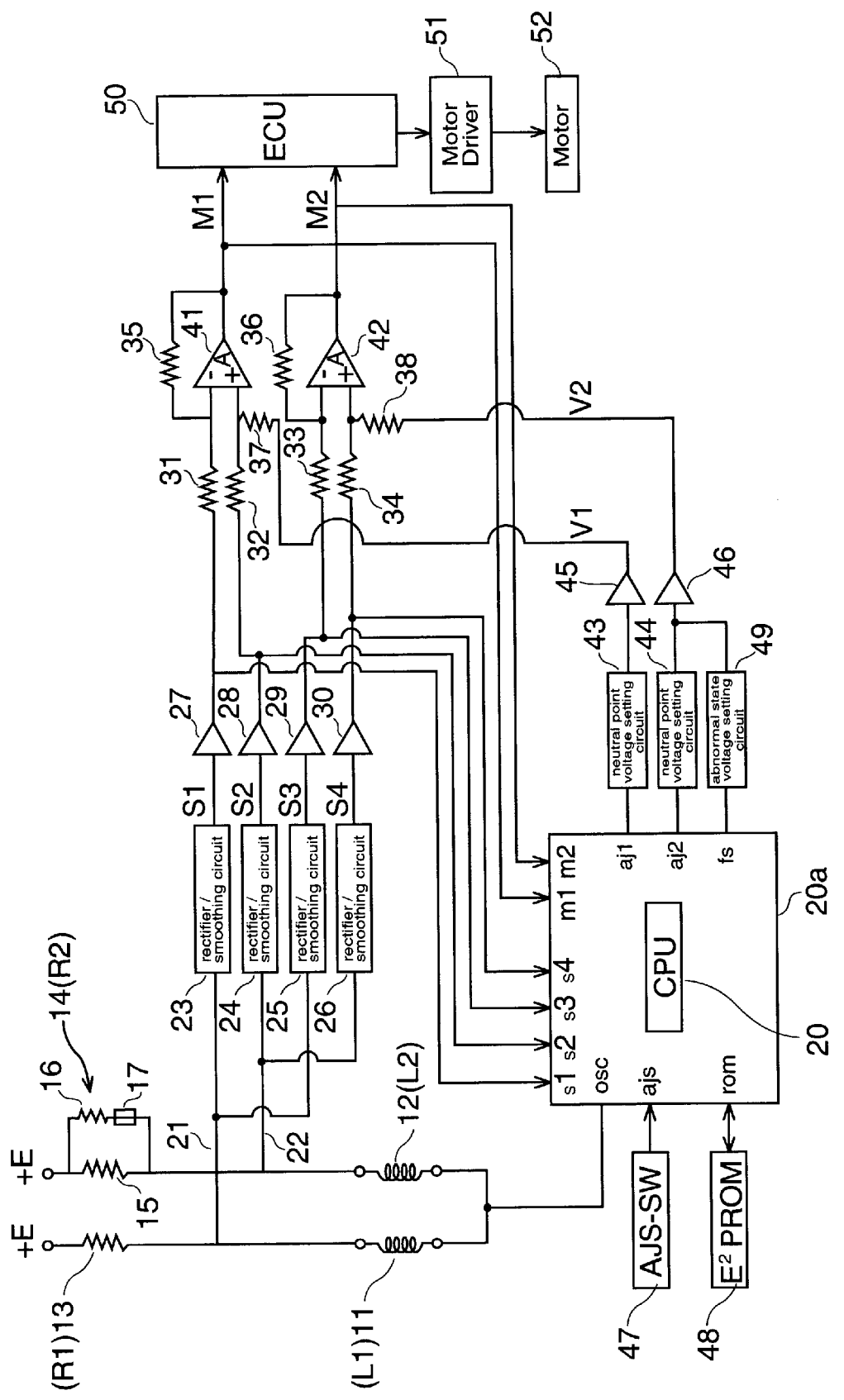
FIG. 2 is a block diagram schematically showing electrical circuit elements of the torque sensor.
Figure 3:
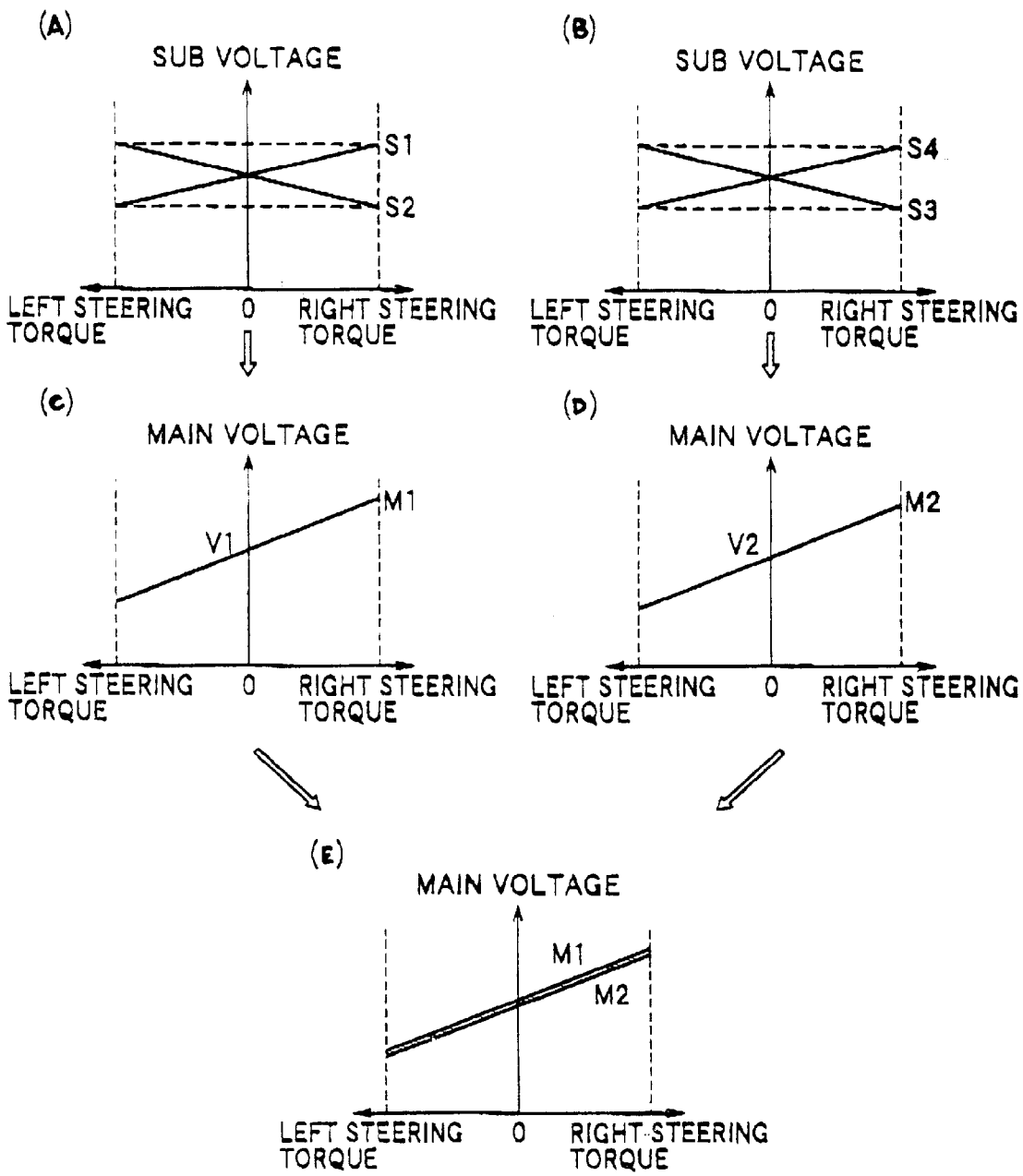
FIG. 3A is a view showing first and second sub-voltages in a normal state.
FIG. 3B is a view showing third and fourth sub-voltages in a normal state.
FIG. 3C is a view showing a first main voltage in a normal state.
FIG. 3D is a view showing a second main voltage in a normal state.
FIG. 3E is a view showing the first and second main voltages in a normal state.
Figure 4:
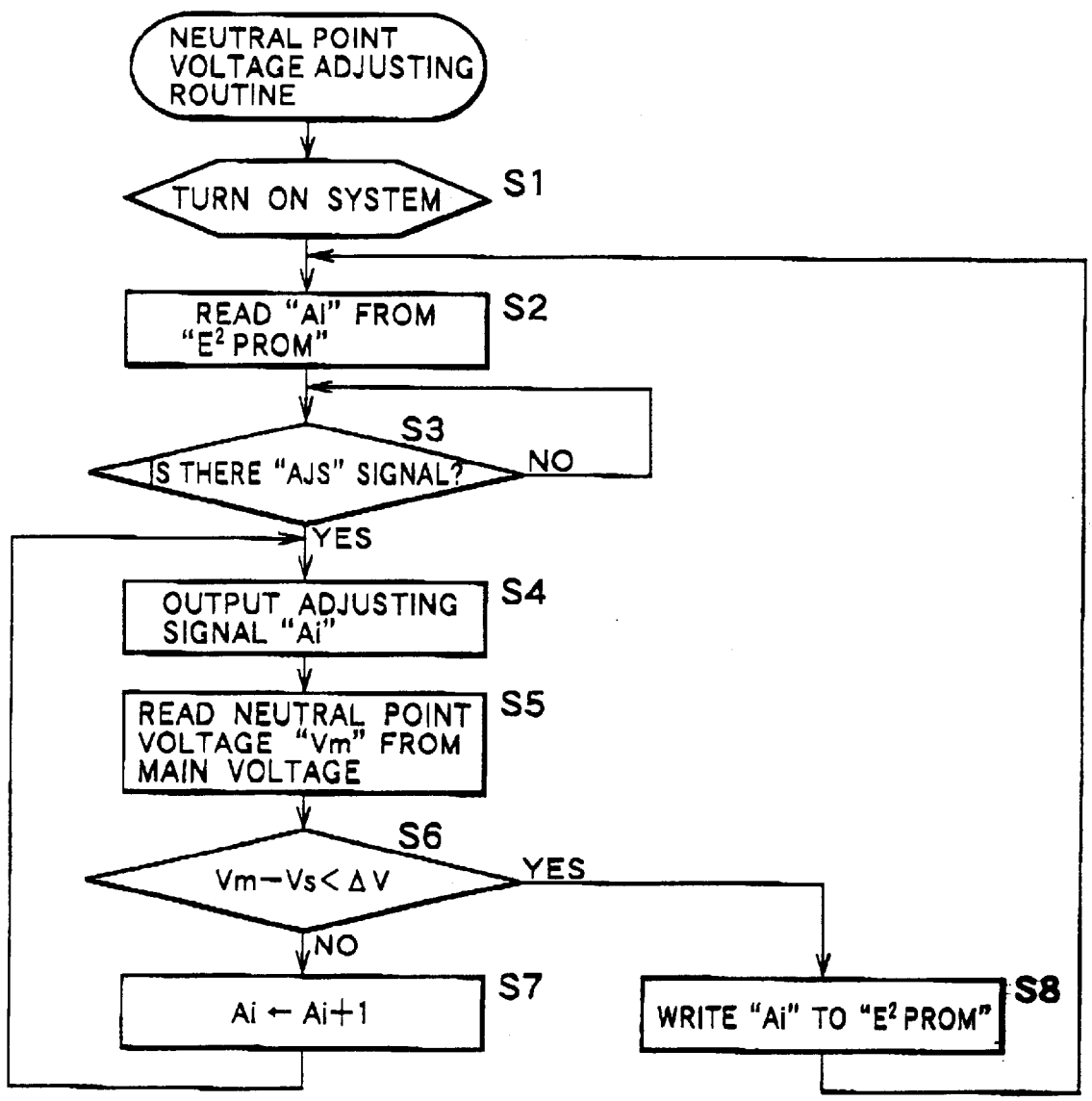
FIG. 4 is a flowchart showing a procedure for adjusting a neutral point voltage.

FIG. 2 is a block diagram schematically showing a construction of electric circuit parts of the torque sensor 1 which detects a torque on the basis of a change of the inductances L1 and L2 of the coils 11 and 12.

The coils 11 and 12 are suspended from a positive voltage E via a resistor 13 (R1) and a resistor circuit 14 (R2, respectively. The other terminal of respective coils 11 and 12 is connected to an oscillating output terminal osc of a control board 20a which is mounted with a CPU 20.

The resistor circuit 14 has a construction in which a resistor 15 is connected in parallel to a resistor 16 and a thermister 17 connected in series, and performs as a temperature compensating function by an effect of the thermister 17.

More specifically, the thermister 17 has a temperature characteristic of showing a resistance value R2 always satisfying a relation R1/L1=R2/L2 regardless of a temperature change.

A voltage signal line 21 extends from a connective portion of the coil 11 and the resistor 13, and diverges so as to be connected to each of rectifier/smoothing circuits 23 and 25. On the other hand, a voltage signal line 22 extends from a connective portion of the coil 12 and the resistor circuit 14, and diverges so as to be connected to each of rectifier/smoothing circuits 24 and 26.

In other words, these coils 11 and 12, the resistor 13 and the resistor circuit 14 constitute a bridge circuit, and when an oscillation voltage is inputted to the bridge circuit, an output voltage of the bridge circuit is inputted to the rectifier/smoothing circuits 23, 24, 25 and 26.

The output voltage of the bridge circuit is rectified and smoothened by each of the rectifier/smoothing circuits 23, 24, 25 and 26 so as to be inputted to buffer circuits 27, 28, 29 and 30 as fist, second, third and fourth sub-voltages S1, S2, S3 and S4.

Output terminals of the buffer its 27 and 28 are connected individually to an inverted input terminal and a non-inverting input terminal of a differential amplifier 41 via resistors 31 and 32.

Likewise, output terminals of the buffer circuits 29 and 30 are connected individually to an inverted input terminal and a non-inverting input terminal of a differential amplifier 42 via resistors 33 and 34.

A negative feedback is applied to the differential amplifiers 41 and 42 by resistors 35 and 36 so as to function as a differential amplify and then, outputs of these differential amplifiers 41 and 42 are inputted to an electronic control unit ECU 50 as a first main voltage M1 and a second main voltage M2.

Neutral point adjusting voltages V1 and V2 are individually inputted to each non-inverting input terminal of the differential amplifiers 41 and 42 from neutral point voltage setting circuits 43 and 44 via buffer circuits 45 ad 46 and resistors 37 and 38.

The neutral point voltage setting circuits 43 and 44 inputs each adjusting signal Ai from neutral point adjusting output terminal aj1 and aj2 of the control board 20a, and then, set neutral point voltages V1 and V2 according to the adjusting signal Ai.

The differential amplifier 41 multiplies a difference between the first sub-voltage. S1 and the second sub-voltage S2 by A, and then, outputs a voltage to which adding the neutral point adjusting voltage V1 as a bias voltage, as a first main voltage M1.

Namely, the first main voltage M1 is obtained from the following equation.

$$M1=(S2 \cdot S1) \cdot A + V1$$

Likewise, a second main voltage M2 outputted by the differential amplifier 42 is obtained from the following equation.

$$M2=(S4-S3) \cdot A + V2$$

In this case, a neutral main voltage, which is biased to neither a right steering torque (torsional torque of right direction) nor a left steering torque (torsional torque of left direction), is called as a neutral point voltage, and the aforesaid neutral point adjusting voltages V1 and V2 are equivalent to the neutral point voltage.

The ECU 50 outputs a motor control signal to a motor driver 51 on the basis of the first main voltage M1, and then, a motor 52 assisting steering is driven by the motor driver 51.

Therefore, unless the neutral point adjusting voltage V1 is a predetermined voltage, it is impossible to accurately control the motor.

On the other hand, the second ma voltage M2 is used for detecting an abnormal state, and the ECU 50 makes a decision whether or not a difference between the first main voltage M1 and the second main voltage M2 is within a predetermined allowable range. In the case where the difference exceeds the allowable range, the ECU 50 makes a decision that the torque sensor 1 is in an abnormal state, and then, outputs an abnormal state signal so as to control or stop the motor 52.

Therefore, the neutral point adjusting voltage V2 must be also a predetermined voltage.

Moreover, when the first, second, third and fourth sub-voltages S1, S2, S3 and S4 and the first and second main voltages M1 and M2 are inputted to the control board 20a, the control board 20a discriminates an abnormal state of coils 11 and 12 on the basis of these first, second, third and fourth sub-voltages S1, S2, S3 and S4. When detecting the abnormal state, the control board 20a outputs an abnormal state detection signal to an abnormal state voltage setting circuit 49 from an abnormal state output terminal fs.

The abnormal state voltage setting circuit 49 is connected to an input terminal of the buffer circuit 46 on a voltage line connected to the non-inverting input terminal of the differential amplifier 42. When inputting the abnormal state detection signal, the abnormal state voltage setting circuit 49 changes the neutral point adjusting voltage V2, which is a bias voltage, to an abnormal state voltage so as to displace the second main voltage M2.

Therefore, when the abnormal state detection signal is outputted, the neutral point adjusting voltage V2, which is a bias voltage, varies so as to displace the second main voltage M2.

The abnormal state voltage setting circuit 49 displaces the second main voltage M2 within a steady-state voltage range, and then, the ECU 50 makes a decision that an abnormal state occurs on the basis of the allowable range described before, and controls or stops the motor 52.

Moreover, in the control board 20a, a neutral point signal AJS for adjusting a neutral point is inputted to a neutral point adjusting terminal ajs from a neutral point adjusting switch AJS-SW 47. An $E^2 PROM$ 48, which is capable of storing and rewriting the neutral point voltage setting state, is connected to a neutral point voltage setting terminal rom.

The torque sensor 1 of this embodiment has a circuit construction as described above, and an operation of the torque sensor will be described below with reference to FIGS. 3A–3E showing each state of first, second, third, fourth sub-voltages S1, S2, S3 and S4 and first and second main voltages M1 and M2.

Each coordinate shown in FIGS. 3A–3E has a vertical axis showing a voltage, the right direction of a horizontal axis showing a right steering torque, and the left direction of a horizontal axis showing a left steering torque. The origin 0 is the neutral point.

FIGS. 3A–3E shows a state and condition in which the torque sensor 1 is normally operated. When a right steering torque increases, the core 8 is moved to the coil 11 side by a relative rotation of the input shaft 4, and the inductance L2 of the coil 12 is increased so that an induced electromotive force of the coil 12 is increased; conversely, the inductance L1 of the coil 11 is decreased so that an induced electromotive force of the coil 11 is reduced. Therefore, the second and fourth sub-voltages S2 and S4 increase; on the other hand, the first and third sub-voltages S1 and S3 decrease (see FIG. 3A and FIG. 3B).

Moreover, in the case where a left steering torque increases, conversely to the above case, the second and fourth sub-voltages S2 and S4 decrease; on the other hand, the first and third sub-voltages S1 and S3 increase (see FIG. 3A and FIG. 3B).

Thus, a difference between the above two sub-voltages is multiplied by A, and then, the neutral point voltage is added to the first and second main voltages M1 and M2 which are the outputs of the differential amplifiers 41 and 42. Accordingly, the first and second main voltages M1 and M2 become inclined lines upward to the right passing through V1 and V2 at the neutral point, as shown in FIG. 3C and FIG. 3D, respectively.

Then, the ECU 50 compares the first and second main voltages M1 and M2, and makes a decision whether or not the difference between these main voltages is within the allowable range.

When the difference is a normal, as shown in FIG. 3E, the change of the first and second main voltages M1 and M2 is approximately coincident; therefore, a decision is made that the difference is within the allowable range.

When a decision is made that the torque sensor is normal, the ECU outputs an instructive signal for driving the motor 52 to the motor driver 51 on the basis of the first main voltage M1.

In the aforesaid manner, an auxiliary power by the motor a onto steering in accordance with a steering torque, and thus, power steering is performed.

In this case, the neutral point voltages V1 and V2 of the first and second main voltages M1 and M2 must be set to a predetermined voltage. The CPU 20 of the control board 20a carries out an adjustment of the neutral point voltages, and the adjusting procedure will be described below with reference to a flowchart shown in FIG. 4.

When the system is turned on (step S1), E²PROM 48 reads one state signal Ai from neutral point voltage setting states stored therein (step S2), and then, waits for an operation by a neutral point adjusting switch AJS-SW 47 (step S3).

When a neutral point adjusting signal AJS is inputted to a neutral point adjusting terminal ajs by the operation of the neural point adjusting switch AJS-SW 47 (step S3), a neutral point voltage adjustment is started, and then, the sequence proceeds to step S4. Thereafter, the state signal Ai is outputted as an adjusting signal Ai from neutral point adjusting output terminals aj1 and aj2 to neutral point voltage setting circuits 43 and 44.

These neutral point voltage setting circuits 43 and 44 set the neutral point voltages V1 and V2 according to the adjusting signal Ai, and then, input a main voltage of the result so as to read a neutral point voltage Vm (step S5).

The CPU 20 compares the neutral point voltage Vm thus read with a reference neutral point voltage Vs stored in the control board 20a, and then, makes a decision whether or not the difference Vm−Vs is within a predetermined value ΔV (step S6). Unless the difference is within the predetermined value ΔV, the CPU 20 updates the adjusting signal Ai to an adjusting signal Ai+1 so as to decrease the difference Vm−Vs (step S7). Then, the sequence returns to step S4.

When the aforesaid steps S4 to step S7 are repeated so that the difference Vm−Vs is set within the predetermined value ΔV, the sequence proceeds from steps S6 to step S8, and then, the neutral point voltage adjustment ends. Thus, the neutral point voltages V1 and V2 are set to a substantially predetermined voltage approximate to the reference neutral point voltage Vs, and the adjusting signal Ai at this time is written in the E²PROM 48 as a neutral point voltage setting state signal (step S8), and thereafter, the sequence returns to step S2.

In the aforesaid manner, the neutral point voltage adjustment is carried out, and the neutral point voltage setting state signal written in the E²PROM 48 at this time is used for setting the neutral point voltages V1 and V2 after that.

As described above, according to the neutral point voltage adjustment by the CPU 20, by only operating the neutral point adjusting switch AJS-SW 47, it is possible to automatically adjust the main voltages M1 and M2 to the neutral point voltage V1 and V2 approximate to a reference voltage, and to simply and securely carry out neutral point voltage adjusting work for the main voltages M1 and M2.

Moreover, the neutral point voltages V1 and V2 of the main voltages M1 and M2 are set to a reference voltage by the neutral point voltage adjustment; therefore, the torque sensor 1 has a general use because the output is always within a predetermined voltage range.

In the update of the adjusting signal Ai, the difference Vm−Vs between the neutral point voltage Vm and the reference neutral point voltage Vs is stepwise made small so that the neutral point voltage is updated as an adjusting signal increasing stepwise.

The neutral point voltage adjustment is carried out, and thereafter, a set neutral point voltage is maintained. When the following case takes place such that the neutral point voltage is shifted due to any cause or aged deterioration, the neutral point voltage adjustment is automatically carried out again by only operating the neutral point adjusting switch AJS-SW 47; therefore, no troublesome adjustment is required.

As heretofore explained, embodiments of the present invention have been described in detail with reference to the drawings. However, the specific configurations of the present invention are not limited to the embodiments but those having a modification of the design within the range of the present invention are also included in the present invention.

As heretofore mentioned, the device according to the present invention provides a neutral point voltage adjuster of a torque sensor which comprises: a pair of coils having inductances changing mutually in a reverse direction in accordance with a torque; and a differential amplifier means inputting first and second sub-voltages based on each inductance change of the both coils, and amplifying a difference between the first and second sub-voltages so as to output it as a main voltage, and which uses a neutral point where no torque is inputted as a boundary between right and left directions, and detects each torsional torque in the right and left direction. A neutral point voltage setting means is employed for displacing a main voltage of an output from the differential amplifier means on the basis of an adjusting signal so as to set a neutral point voltage; a storing means for storing a neutral point voltage setting state by the neutral point voltage setting means; and a neutral point voltage adjusting means for storing a neutral point voltage used as a reference of a main voltage, and inputting the main voltage, and further, outputting the adjusting signal to the neutral point voltage setting means so that a difference between the neutral point voltage read from the main voltage and the reference neutral point voltage is reduced.

Thus, the neutral point voltage adjusting means outputs the adjusting signal to the neutral point voltage setting mean so that a difference between the neutral point voltage read from the main voltage and the reference neutral point voltage is reduced, and then, according to the adjusting signal, the neutral point voltage setting means automatically adjusts the main voltage to a neutral point voltage approximate to the reference voltage. Accordingly, it is possible to simply and securely carry out a neutral point voltage adjustment of the main voltage, and to provide a general use.

Further, the present invention provides the neutral point voltage adjuster of a torque sensor wherein the neutral point voltage adjusting means repeatedly outputs the adjusting signal until a difference between the neutral point voltage and the reference neutral point voltage falls within a predetermined value.

Thus, it is possible to gradually approximate the neutral point voltage of the main voltage to the reference neutral point voltage, and to adjust the neutral point voltage so that the difference falls within a predetermined value.

Further, the present invention provides the neutral point voltage adjuster of a torque sensor further comprising a rewrite means for rewriting a stored content of the storing means into a neutral point voltage setting state after adjustment by the neutral point voltage adjusting means.

Thus, the neutral point voltage adjustment is carried out, and the storing means rewrites and stores the neural point voltage setting state at this time, and, thereafter, the neutral point voltage adjusting means outputs the adjusting signal to the neutral point voltage setting means so as to be set to the neutral point voltage setting state stored in the storing means. Therefore, the neutral point voltage of the main voltage can always maintain the adjusted voltage.

Further, the present invention provides the neutral pit voltage adjuster of a torque sensor further comprising an operating switch means for instructing a neutral point voltage adjustment by the neutral point voltage adjusting means.

Thus, by only operating the operation switch means, the neutral point voltage adjustment is automatically carried out, so that the adjusting work can be simplified.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A neutral point voltage adjuster of a torque sensor which comprises: a pair of coils having inductances changing mutually in a reverse direction in accordance with a torque; and a differential amplifier means inputting first and second sub-voltages based on each inductance change of both coils, and amplifying a difference between the first and second sub-voltages so as to output it as a main voltage, and which uses a neutral point where no torque is inputted as a boundary between right and left directions, and detects each torsional torque in the right and left direction, comprising:

a neutral point voltage setting means for displacing the main voltage of the output from the differential amplifier means on the basis of an adjusting signal so as to set a neutral point voltage;

a storing means for storing a neutral point voltage setting state by the neutral point voltage setting means; and a neutral point voltage adjusting means for storing a neutral point voltage used as a reference of the main voltage, and inputting the main voltage, and further, outputting the adjusting signal to the neutral point voltage setting means so that a difference between the neutral point voltage read from the main voltage and the reference neutral point voltage is reduced.

2. The neutral point voltage adjuster of a torque sensor according to claim 1, wherein the neutral point voltage adjusting means repeatedly outputs the adjusting signal until a difference between the neutral point voltage and the reference neutral point voltage falls within a predetermined value.

3. The neutral point voltage adjuster of a torque sensor according to claim 2, further computing a rewrite means for rewriting a stored content of the storing means into the neutral point voltage setting state after adjustment by the neutral point voltage adjusting means.

4. The neutral point voltage adjuster of a torque sensor according to claim 3, further comprising an operating switch means for instructing a neutral point voltage adjustment by the neutral point voltage adjusting means.

5. The neutral point voltage adjuster of a torque sensor according to claim 2, further comprising an operating switch means for instructing a neutral point voltage adjustment by the neutral point voltage adjusting means.

6. The neutral point voltage adjuster of a torque sensor according to claim 1, further comprising an operating switch means for instructing a neutral point voltage adjustment by the neutral point voltage adjusting means.

* * * * *